(12) United States Patent
Henry et al.

(10) Patent No.: US 11,457,213 B2
(45) Date of Patent: Sep. 27, 2022

(54) METHODS AND DEVICES FOR CODING AND DECODING A DATA STREAM REPRESENTATIVE OF AT LEAST ONE IMAGE

(71) Applicant: ORANGE, Issy-les-Moulineaux (FR)

(72) Inventors: Felix Henry, Chatillon (FR); Mohsen Abdoli, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/255,072

(22) PCT Filed: Jun. 18, 2019

(86) PCT No.: PCT/FR2019/051478
§ 371 (c)(1),
(2) Date: Dec. 22, 2020

(87) PCT Pub. No.: WO2020/002795
PCT Pub. Date: Jan. 2, 2020

(65) Prior Publication Data
US 2021/0274178 A1      Sep. 2, 2021

(30) Foreign Application Priority Data
Jun. 27, 2018   (FR) ...................................... 1855791

(51) Int. Cl.
*H04N 19/124*   (2014.01)
*H04N 19/11*    (2014.01)
(Continued)

(52) U.S. Cl.
CPC ........... *H04N 19/124* (2014.11); *H04N 19/11* (2014.11); *H04N 19/147* (2014.11);
(Continued)

(58) Field of Classification Search
CPC .... H04N 19/147; H04N 19/119; H04N 19/70; H04N 19/96; H04N 19/124; H04N 19/11;
(Continued)

(56) References Cited

U.S. PATENT DOCUMENTS 9,118,918 B2 *  8/2015  Huang ................. H04N 19/124
9,253,508 B2    2/2016  Gao et al.
(Continued)

FOREIGN PATENT DOCUMENTS

EP           3410723 A1 *   12/2018    ........... H04N 19/147
KR    20130045807 A  *   5/2013
(Continued)

OTHER PUBLICATIONS

Thuong Cahn et al., Rate-Distortion Optimized Quantization: a Deep Learning Approach; 978-1-5386-5989-2 (c) 2018 IEEE (Year: 2018).*
(Continued)

*Primary Examiner* — Dramos Kalapodas
(74) *Attorney, Agent, or Firm* — David D. Brush; Westman, Champlin & Koehler, P.A.

(57) ABSTRACT

A coding method and a decoding method for decoding a coded data stream representative of at least one image that is split into blocks. For at least one current block of the image, an item of information indicating a coding mode of the current block is decoded from the data stream. When the coding mode of the current block corresponds to a first coding mode, the current block is decoded using a first determined quantization step to dequantize, in the transform domain, a prediction residue associated with the current block. When the coding mode of the current block corresponds to a second coding mode, the current block is decoded using a second determined quantization step to dequantize, in the spatial domain, a prediction residue
(Continued)

Figure 1:
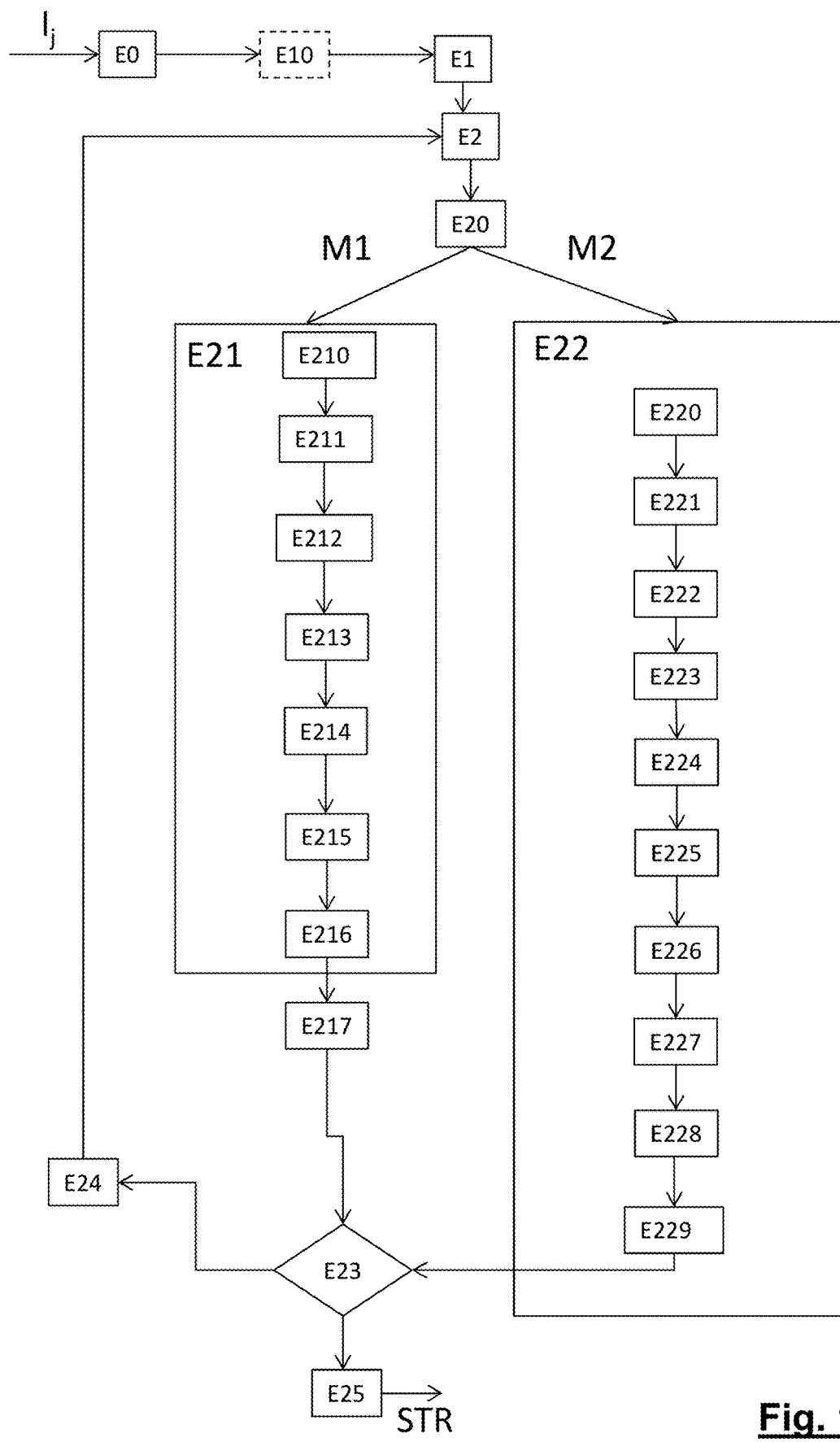

associated with the current block. The first quantization step and the second quantization step are determined according to the same quantization parameter.

18 Claims, 4 Drawing Sheets

(51) Int. Cl.
| | |
|---|---|
| H04N 19/147 | (2014.01) |
| H04N 19/159 | (2014.01) |
| H04N 19/176 | (2014.01) |
| H04N 19/182 | (2014.01) |
| H04N 19/19 | (2014.01) |
| H04N 19/593 | (2014.01) |
| H04N 19/61 | (2014.01) |

(52) U.S. Cl.
CPC ......... *H04N 19/159* (2014.11); *H04N 19/176* (2014.11); *H04N 19/182* (2014.11); *H04N 19/19* (2014.11); *H04N 19/593* (2014.11); *H04N 19/61* (2014.11)

(58) Field of Classification Search
CPC .. H04N 19/159; H04N 19/176; H04N 19/182; H04N 19/19; H04N 19/593; H04N 19/61; H04N 19/157
See application file for complete search history.

(56) References Cited

U.S. PATENT DOCUMENTS

| | | | | |
|---|---|---|---|---|
| 11,184,623 | B2 * | 11/2021 | Zhou | H04N 19/103 |
| 2018/0115787 | A1 * | 4/2018 | Koo | H04N 19/124 |
| 2021/0084304 | A1 * | 3/2021 | Schwarz | H04N 19/70 |
| 2021/0337202 | A1 * | 10/2021 | Xiu | H04N 19/167 |

FOREIGN PATENT DOCUMENTS

| | | | | |
|---|---|---|---|---|
| WO | 2007079964 A1 | 7/2007 | | |
| WO | WO-2007079964 A1 * | 7/2007 | ........... | H04N 19/103 |
| WO | WO-2013128010 A2 * | 9/2013 | ............... | G06T 9/00 |
| WO | WO-2013154747 A1 * | 10/2013 | ........... | H04N 19/126 |
| WO | 2015049491 A1 | 4/2015 | | |
| WO | WO-2015049491 A * | 4/2015 | ............... | G06T 9/00 |
| WO | WO-2021193671 A * | 9/2021 | | |

OTHER PUBLICATIONS

Matthias Wien, "High Efficiency Video Coding, Coding Tools and Specification", Signals and Communication Technology, DOI 10.1007/978-3-662-44276-0, dated 2015.
English translation of the Written Opinion of the International Searching Authority dated Oct. 7, 2019 for corresponding International Application No. PCT/FR2019/051478, filed Jun. 18, 2019.
International Search Report and Written Opinion dated Sep. 19, 2019 for corresponding International Application No. PCT/FR2019/051478, filed Jun. 18, 2019.
Stankowski Jakub et al., "Rate-Distortion Optimized Quantization in HEVC: Performance Limitations", 2015 Picture Coding Symposium (PCS), IEEE, May 31, 2015 (May 31, 2015), pp. 85-89, XP033184672.

* cited by examiner

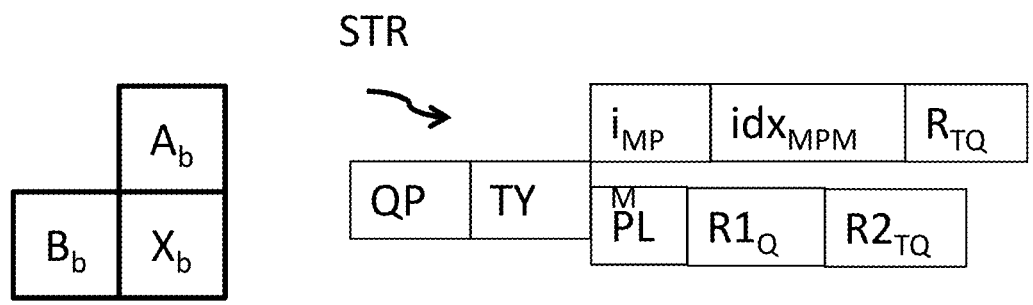
Fig. 2
Fig. 5
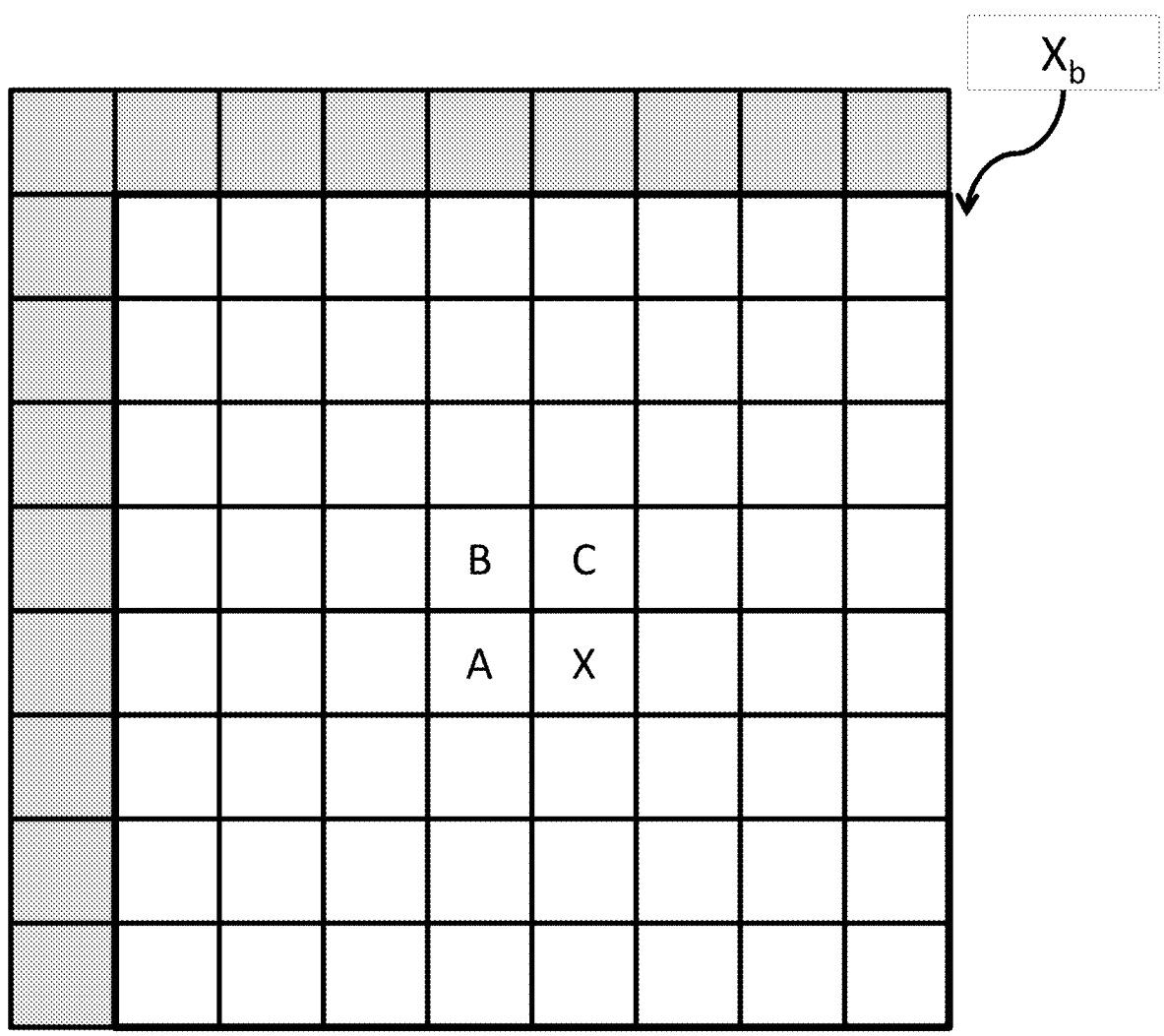
Fig. 3

METHODS AND DEVICES FOR CODING AND DECODING A DATA STREAM REPRESENTATIVE OF AT LEAST ONE IMAGE

CROSS-REFERENCE TO RELATED APPLICATIONS

This Application is a Section 371 National Stage Application of International Application No. PCT/FR2019/051478, filed Jun. 18, 2019, which is incorporated by reference in its entirety and published as WO 2020/002795 A1 on Jan. 2, 2020, not in English.

1. FIELD OF THE INVENTION

The field of the invention is that of coding and decoding images or sequences of images, and in particular video streams.

More specifically, the invention relates to the compression of images or sequences of images using a block representation of the images.

The invention can notably be applied to the image or video coding implemented in the current or future encoders (JPEG, MPEG, H.264, HEVC, etc. and their amendments), and to the corresponding decoding.

2. PRIOR ART

Digital images and sequences of images take up a lot of space in terms of memory, which requires, when transmitting these images, to compress them in order to avoid congestion problems on the network used for this transmission.

Many techniques for compressing video data are already known. Among these, the HEVC compression standard ("High Efficiency Video Coding, Coding Tools and Specification", Matthias Wien, Signals and Communication Technology, 2015) proposes to implement a prediction of pixels of a current image in relation to other pixels belonging to the same image (intra prediction) or to a previous or subsequent image (inter prediction).

More specifically, the intra prediction uses the spatial redundancies within an image. To do this, the images are split into blocks of pixels. The blocks of pixels are then predicted using already reconstructed information, corresponding to the previously coded/decoded blocks in the current image according to the scanning order of the blocks in the image.

Furthermore, in a conventional manner, the coding of a current block is carried out using a prediction of the current block, referred to as the predictor block, and a prediction residue or "residual block", corresponding to a difference between the current block and the predictor block. The resulting residual block is then transformed, for example using a DCT (discrete cosine transform) type transform. The coefficients of the transformed residual block are then quantized, coded by entropy coding and transmitted to the decoder, that can reconstruct the current block by adding this residual block to the predictor block.

The decoding is done image by image, and for each image, block by block. For each block, the corresponding elements of the stream are read. The inverse quantization and the inverse transform of the coefficients of the residual block are performed. Then, the block prediction is calculated to obtain the predictor block, and the current block is reconstructed by adding the prediction (i.e. the predictor block) to the decoded residual block.

In U.S. Pat. No. 9,253,508, a DPCM (Differential Pulse Code Modulation) coding technique for coding blocks in intra mode is integrated into an HEVC encoder. Such a technique consists in predicting a set of pixels of an intra block by another set of pixels of the same block that have been previously reconstructed. In U.S. Pat. No. 9,253,508, a set of pixels of the intra block to be coded corresponds to a row of the block, or a column, or a row and a column, and the intra prediction used to predict the set of pixels is one of the directional intra predictions defined in the HEVC standard.

However, such a technique is not optimal. Indeed, the reconstruction of a set of pixels of the intra block corresponds either to the addition of a prediction residue in the case of a lossless coding, thus offering a fairly low compression ratio, or to the addition of a prediction residue after inverse transform and/or inverse quantization of said other set of pixels serving as a prediction. Such a technique thus does not enable each pixel of the intra block to be predicted using a local prediction function and the predicted pixel to be reconstructed before a subsequent pixel is predicted. Indeed, this technique requires a set of pixels (row/column of the block for example) to be reconstructed to predict another set of pixels. In other words, with each prediction and reconstruction of a part of the block, several pixels of the block are predicted and reconstructed.

Moreover, in U.S. Pat. No. 9,253,508, it is not described how to make conventional intra prediction modes as defined in the HEVC standard for example and the DPCM prediction mode coexist, nor how to determine a quantization step for blocks coded by a DPCM intra prediction as described in U.S. Pat. No. 9,253,508, that is adapted to a rate/distortion optimisation mechanism aiming to minimise the $D+\lambda R$ function where R represents the rate for coding the image, D the associated distortion, and $\lambda$ a Lagrangian.

There is therefore a need for a new coding and decoding method to improve the compression of image or video data.

3. SUMMARY OF THE INVENTION

The invention improves the state of the art. For this purpose, it relates to a method for decoding a coded data stream representative of at least one image that is split into blocks, the decoding method comprises, for at least one block of the image, referred to as the current block:
- decoding an item of information indicating a coding mode of the current block,
- when the coding mode of the current block corresponds to a first coding mode, decoding the current block comprising the determination of a first quantization step to dequantize, in the transform domain, a prediction residue associated with the current block,
- when the coding mode of the current block corresponds to a second coding mode, decoding the current block comprising the determination of a second quantization step to dequantize, in the spatial domain, a prediction residue associated with the current block,
- the first quantization step and the second quantization step being determined according to the same quantization parameter.

According to the invention, it is thus possible to define a first quantization step for the prediction residues to be quantized/dequantized in the transform domain and a second quantization step for the prediction residues to be quantized/dequantized in the spatial domain, the first and second quantization steps being determined by the same quantization parameter. Thus, the first and second quantization steps are linked and can be used together.

Advantageously, according to the invention, the quantization steps used in the different coding modes available for a current block are consistent, in particular for the rate/distortion optimisation mechanism applied to the current block, but the quantization steps are also consistent between blocks, in particular for the rate/distortion optimisation mechanism applied to the image when some blocks are coded according to the first coding mode and other blocks are coded according to the second coding mode. Indeed, if the quantization steps are not linked together, one of the two quantization steps can become very large compared to the other quantization step. The blocks coded according to the coding mode using the very large quantization step would then be highly compressed, unlike the other blocks coded according to the other coding mode using the smaller quantization step, which would result in a significant spatial variability of the visual quality in the image, and thus a lower visual quality of the whole image.

According to the invention, the first coding mode corresponds to a coding of the block in the transform domain. In other words, according to this first coding mode, a prediction residue of the current block calculated in the spatial domain, i.e. between the original block and a predicted block, is transformed, for example by a DCT transform, to provide a block of transform coefficients. This block of transform coefficients is then quantized using the first quantization step.

The second coding mode corresponds to a coding of the block in the spatial domain. In other words, according to this second coding mode, the prediction residue of the current block calculated in the spatial domain is directly quantized, without undergoing any transform operation.

According to a particular embodiment of the invention, when the coding mode of the current block corresponds to the second coding mode, the decoding of the current block further comprises, for each pixel of the current block:
obtaining a prediction of said pixel from another previously decoded pixel, said other previously decoded pixel belonging to said current block or to a previously decoded block of the image,
decoding a prediction residue associated with said pixel,
dequantizing said prediction residue associated with said pixel using said second quantization step,
reconstructing said pixel by adding the prediction of said pixel to the dequantized prediction residue.

According to this particular embodiment of the invention, according to the second coding mode, the prediction of the current block is obtained by a local prediction of each pixel of the current block, using a pixel of the previously decoded current block or a pixel of a previously decoded neighbouring block. The pixel prediction is thus improved.

The invention also relates to a method for coding a coded data stream representative of at least one image that is split into blocks, the coding method comprises, for at least one block of the image, referred to as the current block:
coding an item of information indicating a coding mode of the current block,
when the coding mode of the current block corresponds to a first coding mode, coding the current block comprising the determination of a first quantization step to quantize a prediction residue associated with the current block in the transform domain,
when the coding mode of the current block corresponds to a second coding mode, coding the current block comprising the determination of a second quantization step to quantize a prediction residue associated with the current block in the spatial domain,
the first quantization step and the second quantization step being determined according to the same quantization parameter.

According to a particular embodiment of the invention, when the coding mode of the current block corresponds to the second coding mode, the coding of the current block comprises, for each pixel of the current block:
obtaining a prediction of said pixel from another previously decoded pixel, said other previously decoded pixel belonging to said current block or to a previously decoded block of the image,
obtaining a prediction residue associated with said pixel from the prediction of said pixel,
quantizing said prediction residue associated with said pixel using said second quantization step,
coding said quantized prediction residue.

According to the invention, the current block can be coded/decoded by conventional intra prediction (first coding mode), for example a spatial prediction according to any of the prediction modes defined in the HEVC standard, or by a new intra prediction (second coding mode) based on the use of pixels of the current block that have been previously decoded.

According to this new intra prediction, also referred to as ILR (In-Loop Residual) hereafter, each pixel is predicted, then a residue is calculated for the predicted pixel and the residue is quantized. The quantized residue is then dequantized and added to the prediction of the pixel to reconstruct the value of the pixel and obtain its decoded value. Such a decoded value of the pixel can then be used to predict other pixels of the current block.

Advantageously, such an intra prediction method can predict pixels of the current block using pixels that are spatially closer than the reference pixels used in the conventional intra prediction. The prediction is thus improved.

According to another particular embodiment of the abovementioned decoding method or coding method, the second quantization step is determined according to the first quantization step.

According to this particular embodiment of the invention, the quantization parameter then corresponds to the first quantization step, and the two quantization steps depend on each other.

As a variant of this particular embodiment, the second quantization step is determined by $a*\delta_1+b$ or $c*\delta_1^2+d*\delta_1+e$, with $\delta_1$ corresponding to the first quantization step, and a, b, c, d, e being predetermined parameters.

According to another particular embodiment of the abovementioned decoding method or coding method, the first quantization step is obtained from a quantization step table predetermined for values of the quantization parameter.

According to another particular embodiment of the abovementioned decoding method or coding method, the quantization parameter corresponds to a Lagrangian $\lambda$ used to optimise a $D+\lambda*R$ function where R corresponds to the rate of the data stream and D corresponds to the associated distortion of the decoded image.

According to another particular embodiment of the abovementioned decoding method or coding method, the quantization parameter is coded in the data stream or decoded from the data stream.

According to another particular embodiment, the decoding of the current block according to the second coding mode further comprises:

decoding another prediction residue associated with said current block, dequantizing said other prediction residue associated with said current block using said first quantization step, reconstructing said current block from the reconstructed pixels of the current block and said other dequantized prediction residue.

According to this particular embodiment of the invention, when the current block is coded according to the second coding mode, a second prediction residue is coded/decoded for the current block from the prediction obtained when coding the first prediction residue pixel by pixel. The additional features of this particular embodiment correspond to the decoding steps of the block coded according to the first coding mode. Thus, it is possible to maintain a similar coding/decoding for both coding modes, particularly at the entropy encoder/decoder level, thus further improving compression performance.

The invention also relates to a stream or signal of coded data representative of at least one image, said image being split into blocks, the coded data stream comprises, for at least one block of the image, referred to as the current block:

an item of information indicating a coding mode of the current block, when the coding mode of the current block corresponds to a first coding mode, a prediction residue associated with the current block, comprising coefficients transformed and quantized using a first quantization step, when the coding mode of the current block corresponds to a second coding mode, a prediction residue associated with the current block, comprising prediction residue values quantized in the spatial domain using a second quantization step, the first quantization step and the second quantization step being determined according to the same quantization parameter.

According to a particular embodiment of the invention, the coded data stream further comprises said quantization parameter.

The invention also relates to a decoding device configured to implement the decoding method according to any one of the particular embodiments defined above. This decoding device could, of course, comprise the different characteristics relating to the decoding method according to the invention. Thus, the characteristics and advantages of this decoding device are the same as those of the decoding method, and they are not detailed further.

The decoding device comprises in particular a processor configured, for at least one block of the image, referred to as the current block, to:

decode an item of information indicating a coding mode of the current block, when the coding mode of the current block corresponds to a first coding mode, decode the current block by determining a first quantization step to dequantize, in the transform domain, a prediction residue associated with the current block, when the coding mode of the current block corresponds to a second coding mode, decode the current block by determining a second quantization step to dequantize, in the spatial domain, a prediction residue associated with the current block, the first quantization step and the second quantization step being determined according to the same quantization parameter.

According to a particular embodiment of the invention, such a decoding device is comprised in a terminal.

The invention also relates to a coding device configured to implement the coding method according to any one of the particular embodiments defined above. This coding device could, of course, comprise the different characteristics relating to the coding method according to the invention. Thus, the characteristics and advantages of this coding device are the same as those of the coding method, and they are not detailed further.

The coding device comprises in particular a processor configured, for at least one block of the image, referred to as the current block, to:

code an item of information indicating a coding mode of the current block, when the coding mode of the current block corresponds to a first coding mode, code the current block by determining a first quantization step to quantize a prediction residue associated with the current block in the transform domain, when the coding mode of the current block corresponds to a second coding mode, code the current block by determining a second quantization step to quantize a prediction residue associated with the current block in the spatial domain, the first quantization step and the second quantization step being determined according to the same quantization parameter.

According to a particular embodiment of the invention, such a coding device is comprised in a terminal, or a server.

The decoding method, respectively the coding method, according to the invention can be implemented in various ways, notably in wired form or in software form. According to a particular embodiment of the invention, the decoding method, respectively the coding method, is implemented by a computer program. The invention also relates to a computer program comprising instructions for implementing the decoding method or the coding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Figure 4:
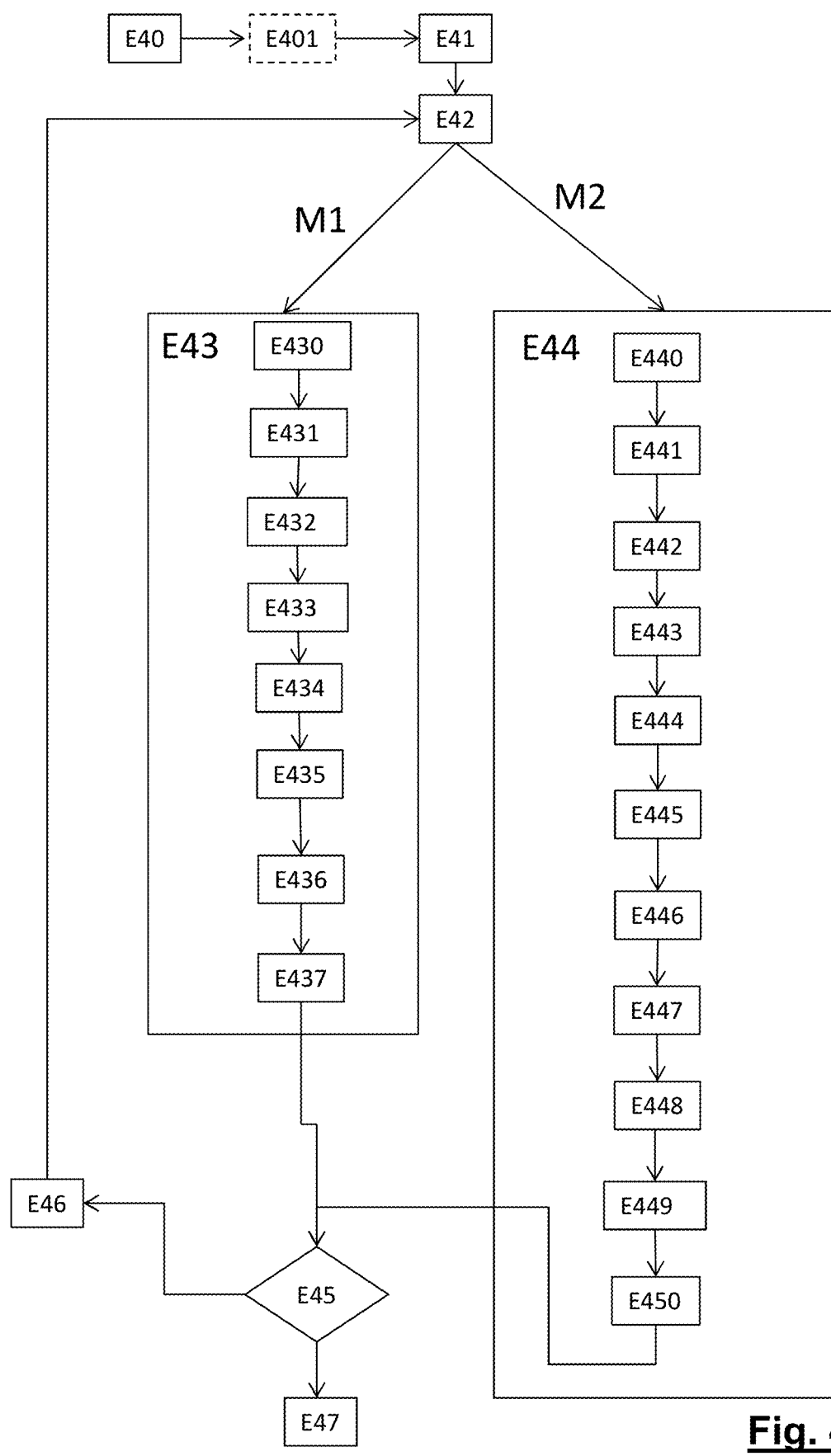
Figure 6:
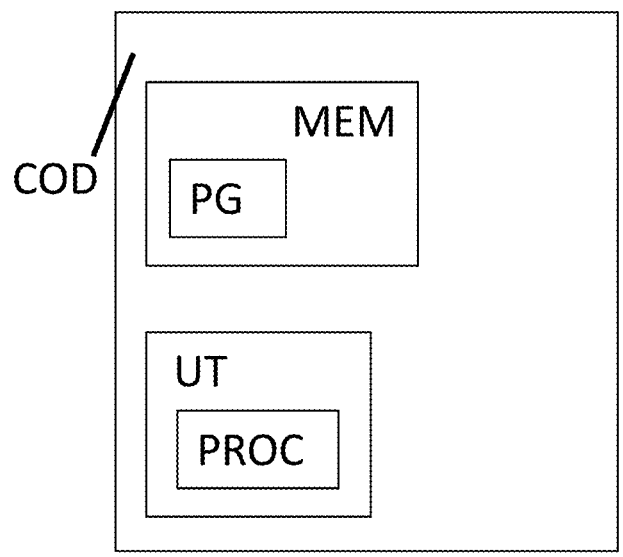
Figure 7:
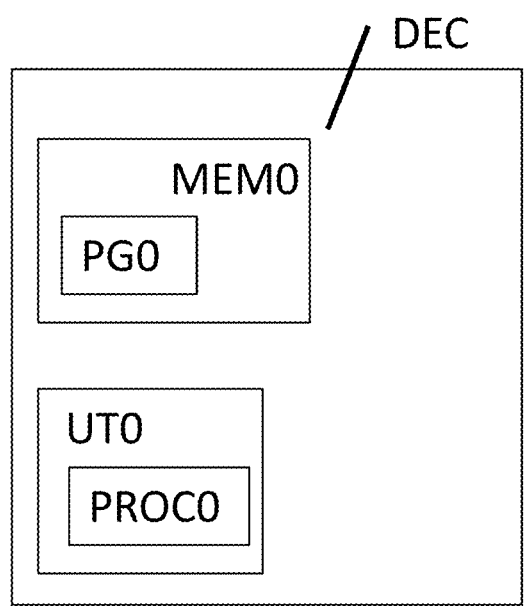

Other characteristics and advantages of the invention will emerge more clearly upon reading the following description of a particular embodiment, provided as a simple illustrative non-restrictive example, and the annexed drawings, wherein:

FIG. 1 shows steps of the coding method according to a particular embodiment of the invention, FIG. 2 illustrates a position example of the neighbouring blocks of a current block to determine an intra prediction mode according to a particular embodiment of the invention, FIG. 3 illustrates a position example of the reference pixels used to predict pixels of a current block according to a particular embodiment of the invention, FIG. 4 shows steps of the decoding method according to a particular embodiment of the invention, FIG. 5 illustrates a signal example comprising coded data representative of at least one block of an image according to a particular embodiment of the invention, FIG. 6 shows the simplified structure of a coding device adapted to implement the coding method according to any one of the particular embodiments of the invention, FIG. 7 shows the simplified structure of a decoding device adapted to implement the decoding method according to any one of the particular embodiments of the invention.

5. DESCRIPTION OF AN EMBODIMENT OF THE INVENTION

5.1 General Principle

The general principle of the invention is to determine a first quantization step used to quantize transform coefficients of a prediction residue and a second quantization step used to directly quantize the values of a prediction residue in the space domain (i.e. without any transform operation), jointly. For this purpose, the first and second quantization steps depend on the same quantization parameter.

According to different particular embodiments of the invention, the quantization parameter can correspond to one or other of the first and second quantization steps, or to a quantization parameter determined by the encoder or by the user, or to a Lagrangian used during rate/distortion optimisation at the encoder.

The quantization parameter can also be coded in the data stream and transmitted to the decoder.

When the quantization parameter corresponds to the first quantization step, the second quantization step can be determined according to a linear or polynomial function of the first quantization step, or a more general function.

The invention thus improves the compression performance when different coding modes respectively carrying out a coding of a prediction residue with and without transform operation are used in the same system for coding/decoding images or sequences of images.

5. 2 Embodiments

FIG. 1 shows steps of the coding method according to a particular embodiment of the invention. For example, a sequence of images $I_1, I_2, \ldots, I_{Nb}$ is coded in the form of a coded data stream STR according to a particular embodiment of the invention. For example, such a coding method is implemented by a coding device as described later in relation to FIG. 6.

A sequence of images $I_1, I_2, \ldots, I_{Nb}$, Nb being the number of images of the sequence to be coded, is provided as input of the coding method. The coding method outputs a coded data stream STR representative of the sequence of images provided as input.

In a known manner, the coding of the sequence of images $I_1, I_2, \ldots, I_{Nb}$ is done image by image according to a coding order previously established and known to the encoder. For example, the images can be coded in the temporal order $I_1, I_2, \ldots, I_{Nb}$ or in another order, for example $I_1, I_3, I_2, \ldots, I_{Nb}$.

In a step E0, an image $I_j$ to be coded of the sequence of images $I_1, I_2, \ldots, I_{Nb}$ is split into blocks, for example into blocks of size 32×32 or 64×64 pixels or more. Such a block can be subdivided into square or rectangular sub-blocks, for example 16×16, 8×8, 4×4, 16×8, 8×16 . . . .

In an optional step E10, according to a particular embodiment of the invention, a quantization parameter QP is coded in the data stream STR, at the data coded for the image $I_j$ or at the data coded for the sequence of images.

Then, in a step E1, a first block or sub-block $X_b$ to be coded of the image $I_j$, is selected according to a predetermined scanning order of the image $I_j$. For example, it can be the first block in the lexicographical scanning order of the image.

In a step E2, the encoder will choose the coding mode to code the current block $X_b$.

According to the particular embodiment described here, the encoder selects the coding mode to code the current block $X_b$ from a first coding mode M1 and a second coding mode M2.

Additional coding modes (not described here) can be used.

According to the particular embodiment described here, the first coding mode M1 corresponds to the coding of the current block by conventional intra prediction, for example as defined according to the HEVC standard, and the second coding mode M2 corresponds to the In-Loop Residual (ILR) prediction coding.

The principle of the invention can be extended to other types of coding modes, whether for the first coding mode M1 or the second coding mode M2. For example, the first coding mode can correspond to any type of coding modes using a transform of the prediction residue before quantizing the coefficients resulting from the transform operation (inter-image prediction coding, spatial prediction with template matching coding, etc.). The second coding mode can correspond to any type of coding modes using a quantization of the values of the prediction residue in the spatial domain, i.e. without performing any transform operation, for example DCT, of the prediction residue.

In step E2, the encoder can perform a rate/distortion optimisation to determine the best coding mode to code the current block. During this rate/distortion optimisation, additional coding modes distinct from the first and the second coding modes can be tested, for example an inter mode coding mode. During this rate/distortion optimisation, the encoder simulates the coding of the current block $X_b$ according to the different available coding modes in order to determine the rate and the distortion associated with each coding mode and selects the coding mode offering the best rate/distortion compromise, for example according to the D+λR function, where R is the rate required to code the current block according to the evaluated coding mode, D is the distortion measured between the decoded block and the original current block, and λ is a Lagrangian multiplier, for example entered by the user or defined at the encoder.

In a step E20, an item of information indicating the coding mode selected for the current block is coded in the data stream STR.

If the current block $X_b$ is coded according to the first coding mode M1, the method proceeds to step E21 for coding the block according to M1. If the current block $X_b$ is coded according to the second coding mode M2, the method proceeds to step E22 for coding the block according to M2.

Step E21 for coding the block according to the first coding mode M1, according to a particular embodiment of the invention, is described below. According to the particular mode described here, the first coding mode corresponds to a conventional intra prediction, such as the one defined in the HEVC standard.

In a step E210, a quantization step $\delta_1$ is determined. For example, the quantization step $\delta_1$ can be set by the user, or calculated using a quantization parameter setting a compromise between compression and quality and entered by the user or defined by the encoder. Thus, such a quantization parameter can be the parameter $\lambda$, used in the rate-distortion cost function $D+\lambda \cdot R$ where D represents the distortion introduced by the coding and R the rate used for coding. This function is used to make coding choices, typically a way of coding the image that minimises this function is sought.

As a variant, the quantization parameter can be QP, corresponding to the quantization parameter conventionally used in the AVC or HEVC standards. Thus, in the HEVC standard, the quantization step $\delta_1$ is determined by the equation $\delta_1$=levelScale[QP %6]<<(QP/6)) where levelScale [k]={40, 45, 51, 57, 64, 72} for k=0.5.

In a step E211, a prediction of the current block is determined using a conventional intra prediction mode. According to this conventional intra prediction, each predicted pixel is calculated only from the decoded pixels originating from the neighbouring blocks (reference pixels) located above the current block, and to the left of the current block. The way the pixels are predicted from the reference pixels depends on a prediction mode that is transmitted to the decoder, and that is chosen by the encoder from a predetermined set of modes known to the encoder and the decoder.

Thus, in HEVC there are 35 possible prediction modes: 33 modes that interpolate the reference pixels in 33 different angular directions, and 2 other modes: the DC mode in which each pixel of the predicted block is produced from the average of the reference pixels, and the PLANAR mode, that performs a planar and non-directional interpolation. This "conventional intra prediction" is well known and also used in the ITU-T H.264 standard (where there are only 9 different modes) as well as in the experimental JEM software available at the Internet address (https://jvet.hhi.fraunhder.de/), where there are 67 different prediction modes. In all cases, the conventional intra prediction respects the two aspects mentioned above (prediction of the pixels from the neighbouring blocks and transmission to the decoder of an optimal prediction mode).

In step E211, the encoder thus chooses one of the available prediction modes from the predetermined list of prediction modes. One way to choose consists for example in evaluating all the prediction modes and keeping the prediction mode that minimises a cost function such as, classically, the rate-distortion cost.

In a step E212, the prediction mode chosen for the current block is coded from the neighbouring blocks of the current block. FIG. 2 shows a position example of the neighbouring blocks $A_b$ and $B_b$ of the current block $X_b$ to code the prediction mode of the current block $X_b$.

In step E212, the intra prediction mode chosen for the current block is coded using the intra prediction modes associated with the neighbouring blocks.

According to a variant of the particular embodiment of the invention described here, the intra prediction mode associated with a block is:
  the intra prediction mode that was used to predict the block, if the block was coded by a conventional intra prediction coding mode.
  the intra prediction mode that was associated with the block, if the block was coded by a coding mode distinct from a conventional intra prediction. An example of such an association is described later in reference to step E229.

Thus, the approach described in the HEVC standard for coding the prediction mode of the current block can be used. In the example in FIG. 2, such an approach consists in identifying the intra prediction mode $m_A$ associated with the block $A_b$ located above the current block, and the intra prediction mode $m_B$ associated with the block $B_b$ located just to the left of the current block. Depending on the value of $m_A$ and $m_B$, a list called MPM (for Most Probable Mode), containing 3 intra prediction modes, and a list called non-MPM, containing the 32 other prediction modes, are created.

According to the variant of the particular embodiment described here, the mechanism for creating the MPM list specified according to the HEVC standard is adapted in order to take into account the association of an intra prediction mode with a block during its coding, when this block is not coded according to the conventional intra coding mode (step E229 described later). According to this variant, a neighbouring block of the current block always has an intra prediction mode associated with it, whether this block was coded according to an intra coding mode or according to another coding mode (ILR, inter, etc.).

The rest of the mechanism for creating the MPM list remains similar to the one specified according to the HEVC standard. If $m_A$ and $m_B$ are both equal to the same intra prediction mode and that intra prediction mode is the DC or PLANAR prediction mode, the MPM list includes the following prediction modes: MPM[0]=PLANAR, MPM[1]=DC, MPM[2]=A(26) corresponding to the angular prediction mode at the index 26 of the HEVC intra prediction mode table.

If $m_A$ and $m_B$ are both equal to the same angular prediction mode m(n), the MPM list comprises the following prediction modes: MPM[0]=m(n), MPM[1]=m(2+(n+29)mod 32), MPM[2]=m(2+(n−1)mod 32).

If $m_A$ and $m_B$ are different, the MPM list comprises the following prediction modes:
  MPM[0]=$m_B$, MPM[1]=$m_A$, MPM[2]=Mlast, where Mlast is defined by:
  if $m_B$ is not equal to the PLANAR mode and mA is not equal to the PLANAR mode, then Mlast is equal to the PLANAR mode,
  if not, if $m_B$ is not equal to the DC mode and mA is not equal to the DC mode, then Mlast is equal to the DC mode,
  otherwise Mlast is equal to the angular mode A(26).

The non-MPM list comprises all the other intra prediction modes not comprised in the MPM list.

According to another variant of the particular embodiment described here, in accordance with the mechanism for creating the MPM list specified according to the HEVC standard, if one of the neighbouring blocks Ab or Bb is not coded according to an intra prediction mode, the DC prediction mode is assigned to it by default. The rest of the mechanism for creating the MPM list remains similar to the one specified according to the HEVC standard and described above.

According to the HEVC standard, in order to code the intra prediction mode of the current block, syntax elements are transmitted:
- a binary indicator indicating if the prediction mode to be coded for the current block is in the MPM list or not,
- if the prediction mode of the current block belongs to the MPM list, an index in the MPM list corresponding to the prediction mode of the current block is coded,
- if the prediction mode of the current block does not belong to the MPM list, an index in the non-MPM list corresponding to the prediction mode of the current block is coded.

In a step E213, the prediction residue R for the current block is constructed.

In step E213, in a conventional manner, a predicted block P is constructed according to the prediction mode chosen in step E211. Then, the prediction residue R is obtained by calculating the difference for each pixel between the predicted block P and the original current block.

In a step E214, the prediction residue R is transformed into RT.

In step E214, a frequency transform is applied to the residue block R in order to produce the block $R_T$ comprising transform coefficients. The transform could be a DCT-type transform for example. It is possible to choose the transform to be used from a predetermined set of transforms $E_T$ and to inform the decoder of the transform used.

In a step E215, the transformed residue block $R_T$ is quantized using for example a quantization step scalar quantization $\delta_1$. This produces the quantized transformed prediction residue block $R_{TQ}$.

In a step E216, the coefficients of the quantized block $R_{TQ}$ are coded by an entropy encoder. For example, the entropy coding specified in the HEVC standard can be used.

According to the embodiment variant described here, in a step E217, the prediction mode determined in step E211 is associated with the current block.

In a known manner, the current block is decoded by dequantizing the coefficients of the quantized block $R_{TQ}$, then applying the inverse transform to the dequantized coefficients to obtain the decoded prediction residue. The prediction is then added to the decoded prediction residue in order to reconstruct the current block and obtain its decoded version. The decoded version of the current block can then be used later to spatially predict other neighbouring blocks of the image or to predict blocks of other images by inter-image prediction.

Step E22 for coding the block according to the second coding mode M2, according to a particular embodiment of the invention, is described below. According to the particular embodiment described here, the second coding mode corresponds to an ILR prediction coding.

In a step E220, a local predictor PL for the current block is determined. According to the coding mode described here, the pixels of the current block are predicted by previously reconstructed pixels of a neighbouring block of the current block or of the current block itself.

Preferably, for the prediction, pixels that are as close as possible to the pixel to be predicted are chosen. This is why it is referred to a local predictor. The local predictor PL can also be assimilated to a prediction mode of the current block associated with the second coding mode M2. According to this interpretation, in the particular embodiment described here, the first coding mode uses a first group of intra prediction modes, for example the intra prediction modes defined by the HEVC standard, and the second coding mode, here the ILR mode, uses a second group of prediction modes distinct from the first group of intra prediction modes. According to an embodiment variant described later, a correspondence between these two groups of prediction modes can be determined.

The local predictor PL can be unique or it can be selected from a set of predetermined local predictors (second group of prediction modes).

According to an embodiment variant, 4 local predictors are defined. Thus, if we call X a current pixel to be predicted from the current block, A the pixel located immediately to the left of X, B the pixel located immediately to the left of and above X, C the pixel located immediately above X, as illustrated in FIG. 3 showing a current block $X_b$. 4 local predictors PL1, PL2, PL3, PL4 can be defined as follows:

PL1(X)=min(A,B) if C max(A,B)
max(A,B) if C min(A,B)
A+B−C otherwise
PL2(X)=A
PL3(X)=B
PL4(X)=C where min(A,B) corresponds to the function returning the smallest value between the value of A and the value of B and max(A,B) corresponds to the function returning the largest value between the value of A and the value of B.

In step E220, the local predictor PL used for the current block is determined. In other words, the same local predictor will be used for all the pixels of the current block, i.e. the same prediction function. For this purpose, several embodiment variants are possible.

The coding of the current block with each of the predictors can be simulated (similarly to an optimisation to choose a coding mode for the current block), and the local predictor that optimises a cost function (for example, that minimises the D+λ·R function where R is the rate used to code the block, D is the distortion of the decoded block relative to the original block, and λ is a parameter set by the user) is selected.

Or, in order to limit the complexity of selecting a local predictor for the current block, an orientation of the texture of the previously coded pixels is analysed. For example, the previously coded pixels in the block that are located above or to the left of the current block are analysed using a Sobel-type operator. If it is determined that:
- the orientation is horizontal, the local predictor PL2 is selected,
- the orientation is vertical, the local predictor PL3 is selected,
- the orientation is diagonal, the local predictor PL4 is selected,
- if no orientation emerges, the local predictor PL1 is selected.

A syntax element is coded in the data stream STR to indicate to the decoder which local predictor was used to predict the current block.

In a step E221, a quantization step $\delta_2$ is determined. According to the particular embodiment described here, the quantization step $\delta_2$ depends on the same quantization parameter as the quantization step $\delta_1$ that would be determined in step E210, if the current block was coded according to the first coding mode.

According to one variant, the quantization step $\delta_2$ can be determined according to the quantization step $\delta_1$. For example, a linear or polynomial function can be used, such as $\delta_2 = a_1 * \delta_1 + b_1$, where $a_1$ and $b_1$ are predetermined integers or real numbers, or $\delta_2 = c_1 * \delta_1^2 + d_1 * \delta_1 + e_1$ or $c_1$, $d_1$ and $e_1$ are predetermined integers or real numbers. For example, $a_1=2$, $b_1=10$, $c_1=0.1$, $d_1=2$ and $e_1=10$. Other values are possible.

According to another variant, the quantization step $\delta_2$ can be determined from the parameter A setting the compromise between compression and quality. This Lagrangian parameter A can be entered by the user or defined by the encoder, similarly to $\delta_1$ or determined from the previously mentioned quantization parameter QP.

According to another variant, the quantization step $\delta_2$ can be set directly by the user, and it is then the quantization step $\delta_1$ that depends on $\delta_2$.

In a step E222, a prediction residue R1 is calculated for the current block. For this purpose, once the local predictor is chosen, for each current pixel of the current block:

the current pixel X of the current block is predicted by the selected local predictor PL, using either pixels outside the block and already reconstructed (and thus available with their decoded value), or pixels previously reconstructed in the current block, or both, in order to obtain a predicted value PRED. In all cases, the predictor PL uses previously reconstructed pixels. In FIG. 3, it can be seen that the pixels of the current block located on the first row and/or the first column of the current block will use as reference pixels (to construct the predicted value PRED) pixels outside the block and already reconstructed (pixels in grey in FIG. 3) and possibly already reconstructed pixels of the current block. For the other pixels of the current block, the reference pixels used to construct the predicted value PRED are located inside the current block.

the difference DIFF between PRED and X is quantized into a value Q(X), by a quantization step scalar quantizer $\delta_2$, by Q(X)=ScalarQuant(DIFF)=ScalarQuant($\delta_2$, X-PRED), the scalar quantizer being for example a nearest-neighbour scalar quantizer such as:

$$ScalarQuant(\Delta, x) = floor\left(\frac{x + \frac{\Delta}{2}}{\Delta}\right).$$

Q(X) is the quantized residue associated with X. It is calculated in the spatial domain, i.e. calculated directly from the difference between the predicted value PRED of the pixel X and the original value of X. Such a quantized residue Q(X) for the pixel X is stored in a quantized prediction residue block $R1_Q$, that will be coded later.

the decoded predicted value P1(X) of X is calculated by adding to the predicted value PRED the dequantized value of the quantized residue Q(X). The decoded predicted value P1(X) of X is thus obtained by P1(X)=PRED+ScalarDequant($\delta_2$, Q(X)). For example, the nearest scalar quantization inverse function is given by: ScalarDequant($\Delta$,x)=$\Delta \times$x.

The decoded predicted value P1(X) thus makes it possible to predict possible pixels that remain to be processed in the current block. Moreover, the block P1 comprising the decoded/reconstructed values of the pixels of the current block is the ILR predictor of the current block (as opposed to the conventional intra predictor).

The sub-steps described above are performed for all the pixels of the current block, in a scanning order that ensures that the pixels used for the prediction chosen from PL1, . . . , PL4 are available.

According to an embodiment variant, the scanning order of the current block is the lexicographical order, i.e. from left to right, and from top to bottom.

According to another embodiment variant, several scanning orders of the current block can be used, for example:
the lexicographical order, or
scanning the first column from top to bottom, then the column just to the right of it, etc., or,
scanning the diagonals one after the other.

According to this other variant, it is possible to simulate the coding cost associated with each of the scanning orders and to choose the best scanning order for the current block in terms of rate/distortion, then to code for the current block an item of information representative of the chosen scanning order.

At the end of step E222, the quantized residue block $R1_Q$ was determined. This quantized residue block $R1_Q$ must be coded for transmission to the decoder. The predictor P1 of the current block was also determined.

In a step E223, the quantized residue block $R1_Q$ is coded for transmission to the decoder. Any known approach such as the method described in HEVC can be used to code the quantized coefficients of a conventional prediction residue. For example, according to an embodiment variant, the values of the quantized residue block $R1_Q$ are coded using an entropy encoder in the data stream STR.

According to a particular embodiment of the invention, it is possible to determine and code an additional prediction residue R2 from the ILR predictor obtained for the current block. The coding of an additional prediction residue R2 is, however, optional. It is indeed possible to simply code the current block by its predicted version P1 and the quantized residue $R1_Q$.

In order to code an additional prediction residue R2 for the current block, the following steps are implemented.

In a step E224, the difference R2 between the predictor P1 and the original current block $X_b$ is calculated to form an additional residue R2: R2=$X_b$–P1. The following steps correspond to the conventional coding steps for this residue R2.

In a step E225, the residue R2 is transformed using a frequency transform in order to produce the block of coefficients $R2_T$.

The transform can be a DCT-type transform for example. It is possible to choose the transform to be used from a predetermined set of transforms $E_{T2}$ and to inform the decoder of the transform used. In this case, the set $E_{T2}$ can be different from the set $E_T$, in order to adapt to the particular statistics of the residue R2.

In a step E226, the block of coefficients $R2_T$ is quantized, for example using a quantization step scalar quantization $\delta$. This produces the block $R2_{TQ}$.

The quantization step $\delta$ can be set by the user. It can also be calculated using another parameter $\lambda$ setting the compromise between compression and quality and entered by the user or the encoder. For example, the quantization step $\delta$ can correspond to the quantization step $\delta_1$ or be determined similarly to it.

In a step E227, the coefficients of the quantized block $R2_{TQ}$ are then transmitted in a coded manner. For example, the coding specified in the HEVC standard can be used.

In a known manner, the current block is decoded by dequantizing the coefficients of the quantized block $R2_{TQ}$, then applying the inverse transform to the dequantized coefficients to obtain the decoded prediction residue. The prediction P1 is then added to the decoded prediction residue in order to reconstruct the current block and obtain its decoded version $X_{rec}$. The decoded version $X_{rec}$ of the current block can then be used later to spatially predict other neighbouring blocks of the image or to predict blocks of other images by inter-image prediction.

According to a particular embodiment of the invention, a conventional intra prediction mode is determined and associated with the current block. For this purpose, in a step E228, an intra prediction mode is determined for the current block from the list of intra prediction modes available in the conventional intra coding mode.

Several embodiment variants are possible.

According to a variant, the list of MPM prediction modes is created for the current block according to the mechanism described above for coding according to the first coding mode M1. According to this variant, the prediction mode is determined as the first mode in the MPM list.

According to another variant, the prediction mode is predetermined, for example it can be a prediction mode defined by default, or transmitted in the data stream. For example, the predetermined prediction mode is the PLANAR mode of the HEVC standard.

According to another variant, the prediction mode is determined as the intra prediction mode that best approximates the decoded current block $X_{rec}$. According to this variant, all the prediction modes are evaluated by measuring a distortion between the decoded current block $X_{rec}$ and the predicted block obtained by the evaluated prediction mode. The intra prediction mode providing the smallest distortion is selected.

According to another variant, the prediction mode is determined as the intra prediction mode that best approximates the predicted current block P1 obtained by the ILR prediction. According to this variant, all the prediction modes are evaluated by measuring a distortion between the predicted current block P1 and the predicted block obtained by the evaluated prediction mode. The intra prediction mode providing the smallest distortion is selected.

According to another variant, when for an ILR coded block, there are several possible local predictors, the intra prediction mode can be dependent on the local predictor chosen to predict the current block. For example, an association table indicates which intra prediction mode should be associated with the current block according to the chosen local predictor.

In a step E229, the determined intra prediction mode is associated with the current block. The idea here is to associate an intra prediction mode but not to transmit it to the decoder. The method that determines the intra mode to be associated with the current block is reproducible in the decoder and does not require the transmission of any information.

Several embodiment variants have been described above, but the encoder and the decoder must, of course, implement the same variant.

According to the particular embodiment described here, the intra prediction mode associated with the current block can then be used to:
- predict the intra prediction mode of a subsequent block that would be coded in conventional intra mode, or
- determine, where appropriate, the intra prediction mode to be associated with a subsequent block that would be coded according to another coding mode distinct from the conventional intra prediction mode. This other coding mode could be an ILR coding mode, or other (inter, etc.).

In a step E23, it is checked if the current block is the last block of the image to be processed by the coding method, taking into account the previously defined scanning order. If yes, the method proceeds to coding (step E25) the next image of the video, if any. If no, in a step E24, the subsequent block of the image to be processed is selected according to the previously defined scanning order of the image and the coding method proceeds to step E2, where the selected block becomes the current block to be processed.

FIG. 4 shows steps of the method for decoding a stream STR of coded data representative of a sequence of images $I_1$, $I_2$, . . . , $I_{Nb}$ to be decoded according to a particular embodiment of the invention.

For example, the data stream STR was generated via the coding method shown in relation to FIG. 1. The data stream STR is provided as input to a decoding device DEC, as described in relation to FIG. 7.

The decoding method decodes the stream image by image and each image is decoded block by block.

In a step E40, an image $I_j$ to be decoded is subdivided into blocks. Each block will undergo a decoding operation consisting in a series of steps that are detailed hereafter. Blocks can be the same size or different sizes.

In an optional step E401, according to a particular embodiment of the invention, a quantization parameter QP is read from the data stream STR.

In a step E41, a first block or sub-block $X_b$ to be decoded of the image $I_j$ is selected as the current block according to a predetermined scanning order of the image $I_j$. For example, it can be the first block in the lexicographical scanning order of the image.

In a step E42, an item of information indicating a coding mode for the current block is read from the data stream STR. According to the particular embodiment described here, this item of information indicates if the current block is coded according to a first coding mode M1 or according to a second coding mode M2. According to the particular embodiment described here, the first coding mode M1 corresponds to the conventional intra prediction coding of the current block, for example as defined according to the HEVC standard, and the second coding mode M2 corresponds to the In-Loop Residual (ILR) prediction coding.

In other particular embodiments, the item of information read from the stream STR can also indicate the use of other coding modes to code the current block (not described here).

The step E43 for decoding the current block when the current block is coded according to the first coding mode M1 is described below.

In a step E430, a quantization step $\delta_1$ is determined. For example, the quantization step $\delta_1$ is determined from the quantization parameter QP read in step E401 or similarly to what was done at the encoder. For example, the quantization step $\delta_1$ can be calculated using the quantization parameter QP read in step E401. For example, the quantization parameter QP can be the quantization parameter conventionally used in the AVC or HEVC standards. Thus, in the HEVC standard, the quantization step $\delta_1$ is determined by the equation $\delta_1$=levelScale[QP % 6]<<(QP/6)) where levelScale [k]={40, 45, 51, 57, 64, 72} for k=0.5.

In a step E431, the prediction mode chosen to code the current block is decoded from the neighbouring blocks. For this purpose, as it was done at the encoder, the intra prediction mode chosen for the current block is coded using the intra prediction modes associated with the neighbouring blocks of the current block.

According to a variant of the particular embodiment of the invention described here, the intra prediction mode associated with a block is:
- the intra prediction mode that was used to predict the block if the block was coded by a conventional intra prediction coding mode, the intra prediction mode that was associated with the block if the block was coded by a coding mode distinct from a conventional intra prediction. An example of such an association is described later in reference to steps E449 and E450.

The construction of both MPM and non-MPM lists is strictly similar to what was done during coding. According to the HEVC standard, syntax elements of the following type are decoded:
- a binary indicator indicating if the prediction mode to be coded for the current block is in the MPM list or not,
- if the prediction mode of the current block belongs to the MPM list, an index in the MPM list corresponding to the prediction mode of the current block is coded,
- if the prediction mode of the current block does not belong to the MPM list, an index in the non-MPM list corresponding to the prediction mode of the current block is coded.

The binary indicator and the prediction mode index are thus read for the current block from the data stream STR, to decode the intra prediction mode of the current block.

In a step E432, the decoder constructs a predicted block P for the current block from the decoded prediction mode.

In a step E433, the decoder decodes the coefficients of the quantized block $R_{TQ}$ from the data stream STR, for example using the decoding specified in the HEVC standard.

In a step E434, the decoded block $R_{TQ}$ is dequantized, for example using a quantization step scalar dequantization $\delta_1$. This produces the block of dequantized coefficients $R_{TQD}$.

In a step E435, an inverse frequency transform is applied to the block of dequantized coefficients $R_{TQD}$ in order to produce the decoded prediction residue block $R_{TQDI}$. The transform could be an inverse DCT-type transform for example. It is possible to choose the transform to be used from a predetermined set of transforms $E_{TI}$ by decoding an indicator from the data stream STR.

In a step E436, the current block is reconstructed from the predicted block P obtained in step E432 and the decoded residue block $R_{TQDI}$ obtained in step E435, in order to produce the decoded current block $X_{rec}$, by $X_{rec}=P+R_{TQDI}$.

According to the embodiment variant described here, in a step E437, the intra prediction mode decoded in step E431 is associated with the current block.

The step E44 for decoding the current block when the current block is coded according to the second coding mode M2 is described below.

In a step E440, the local predictor PL used to predict the pixels of the current block is determined. In the case where only one predictor is available, the local predictor is, for example, set by default at the decoder level and no syntax element needs to be read from the stream STR to determine it.

In the case where several local predictors are available, for example the predictors PL1-PL4 described above, a syntax element is decoded from the data stream STR to identify which local predictor was used to predict the current block. The local predictor is thus determined from that decoded syntax element.

In a step E441, the quantization step $\delta_2$ is determined, similarly to what was done at the encoder.

In a step E442, the quantized residue $R1_Q$ is decoded from the data stream STR. Any known approach such as the method described in HEVC can be used to decode the quantized coefficients of the conventional prediction residue.

In a step E443, the quantized residue block $R1_Q$ is dequantized using the quantization step $\delta_2$, in order to produce the dequantized residue block $R1_{QD}$.

In a step E444, when the dequantized residue block $R1_{QD}$ is obtained, the predicted block P1 is constructed using the local predictor PL determined in step E440.

In step E444, each pixel of the current block is predicted and reconstructed as follows:
- the current pixel X of the current block is predicted by the selected predictor PL, using either pixels outside the block and already reconstructed, or previously reconstructed pixels of the current block, or both, in order to obtain a predicted value PRED. In all cases, the predictor PL uses previously decoded pixels.
- the decoded predicted value P1(X) of the current pixel X is calculated by adding to the predicted value PRED the dequantized value of the prediction residue $R1_{QD}$, such that $P1(X)=PRED+R1_{QD}(X)$.

These steps are implemented for all the pixels of the current block, in a scanning order that ensures that the pixels used for the prediction chosen from PL1, . . . , PL4 are available.

For example, the scanning order is the lexicographical order (from left to right, then rows from top to bottom).

According to a particular embodiment of the invention, the predicted block P1 comprising the decoded predicted values P1(X) of each pixel of the current block forms here the decoded current block $X_{rec}$.

According to another particular embodiment of the invention, it is considered here that an additional prediction residue was coded for the current block. It is therefore necessary to decode this additional prediction residue in order to reconstruct the decoded version of the current block $X_{rec}$.

For example, this other particular embodiment can be activated or not by default at the encoder and decoder level. Or, an indicator can be coded in the data stream with the block level information to indicate for each block coded according to the ILR coding mode if an additional prediction residue is coded. Or further, an indicator can be coded in the data stream with the image or sequence of images level information to indicate for all the blocks of the image or of the sequence of images coded according to the ILR coding mode if an additional prediction residue is coded.

When an additional prediction residue is coded for the current block, in a step E445, the coefficients of the quantized prediction residue $R2_{TQ}$ are decoded from the data stream STR, using means adapted to those implemented at the encoder, for example the means implemented in an HEVC decoder.

In a step E446, the block of quantized coefficients $R2_{TQ}$ is dequantized, for example using a quantization step scalar dequantization $\delta_1$. This produces the block of dequantized coefficients $R2_{TQD}$.

In a step E447, an inverse frequency transform is applied to the block $R2_{TQD}$ in order to produce the decoded prediction residue block $R2_{TQDI}$.

The inverse transform could be an inverse DCT-type transform for example.

It is possible to choose the transform to be used from a predetermined set of transforms $E_{T2}$ and to decode the item of information informing the decoder of the transform to be used. In this case, the set $E_{T2}$ is different from the set $E_T$, in order to adapt to the particular statistics of the residue R2.

In a step E448, the current block is reconstructed by adding the predicted block P1 obtained in step E444 to the decoded prediction residue $R2_{TQDI}$.

According to a particular embodiment of the invention, a conventional intra prediction mode is determined and associated with the current block. For this purpose, in a step E449, an intra prediction mode is determined for the current block from the list of intra prediction modes available in the conventional intra coding mode. This determination is implemented similarly to what was implemented at the encoder level.

In a step E450, the determined intra prediction mode is associated with the current block.

In a step E45, it is checked if the current block is the last block of the image to be processed by the decoding method, taking into account the previously defined scanning order. If yes, the method proceeds to decoding (step E47) the next image of the video, if any. If no, in a step E46, the subsequent block of the image to be processed is selected according to the previously defined scanning order of the image and the decoding method proceeds to step E42, the selected block becoming the current block to be processed.

FIG. 5 illustrates a signal example STR comprising coded data representative of at least one block of an image according to a particular embodiment of the invention. For example, the signal STR can comprise a quantization parameter QP for determining the quantization step $\delta_1$ and the quantization step $\delta_2$ described above. This quantization parameter QP can be coded at the block level, or at the image or sequence of images level when coding a video.

The signal STR comprises a coded indicator TY indicating for a block of an image a coding mode for that block When the TY indicator indicates that the block is coded according to the second coding mode, here the ILR mode, the signal then comprises coded values of quantized prediction residues $R1_Q$ and possibly coded values of quantized transformed prediction residues $R2_{TQ}$. When several local predictors are possible for the current block, the signal also comprises a local predictor PL coded indicator.

When the indicator TY indicates that the block is coded according to the first coding mode, here the conventional intra prediction mode, the signal then comprises coded values of quantized transformed prediction residues $R_{TQ}$, a binary indicator $i_{MPM}$ indicating whether or not the prediction mode to be coded for the current block is in the MPM list, and an index $idx_{MPM}$ indicating the index of current block prediction mode in the corresponding list.

FIG. 6 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

FIG. 7 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEM0, a processing unit UT0, equipped for example with a processor PROC0, and driven by the computer program PG0 stored in the memory MEM0. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

The invention claimed is:

1. A decoding method for decoding a coded data stream representative of at least one image performed by a decoding device, said image being split into blocks, the decoding method comprises, for at least one block of the image, referred to as a current block:
   decoding an item of information indicating a coding mode of the current block,
   determining the coding mode of the current block from among at least a first and a second coding mode,
   when the coding mode of the current block corresponds to the first coding mode, decoding the current block comprising determining a first quantization step according to a quantization parameter to dequantize, in a transform domain, a prediction residue associated with the current block,
   when the coding mode of the current block corresponds to the second coding mode, decoding the current block comprising determining the first quantization step according to the quantization parameter and determining a second quantization step to dequantize, in a spatial domain, a prediction residue associated with the current block,
   the second quantization step being determined according to the first quantization step.

2. The decoding method according to claim 1, wherein when the coding mode of the current block corresponds to the second coding mode, the decoding of the current block further comprises, for each pixel of the current block:
   obtaining a prediction of said pixel from another previously decoded pixel, said other previously decoded pixel belonging to said current block or to a previously decoded block of the image,
   decoding a prediction residue associated with said pixel,
   dequantizing said prediction residue associated with said pixel using said second quantization step,
   reconstructing said pixel by adding the prediction of said pixel to the dequantized prediction residue.

3. The decoding method according to claim 1, wherein the coefficients of the prediction residue associated with the current block, when the coding mode of the current block corresponds to the second coding mode, are decoded by an entropy decoder, which was used to decode the coefficients of the prediction residue associated with the current block, when the coding mode of the current block corresponds to the first coding mode.

4. A coding method for coding a coded data stream representative of at least one image by a coding device, said image being split into blocks, the coding method comprises, for at least one block of the image, referred to as a current block:

coding an item of information indicating a coding mode of the current block, determining a coding mode of the current block from among at least a first and a second coding mode;

when the coding mode of the current block corresponds to a first coding mode, coding the current block comprising determining a first quantization step according to a quantization parameter to quantize a prediction residue associated with the current block in a transform domain, when the coding mode of the current block corresponds to a second coding mode, coding the current block comprising determining the first quantization step and determining a second quantization step to quantize a prediction residue associated with the current block in a spatial domain, the second quantization step being determined according to the first quantization step.

5. The coding method according to claim 4, wherein when the coding mode of the current block corresponds to the second coding mode, the coding of the current block comprises, for each pixel of the current block:

obtaining a prediction of said pixel from another previously decoded pixel, said other previously decoded pixel belonging to said current block or to a previously decoded block of the image, obtaining a prediction residue associated with said pixel from the prediction of said pixel, quantizing said prediction residue associated with said pixel using said second quantization step, coding said quantized prediction residue.

6. The coding method according to claim 4, wherein the coefficients of the prediction residue associated with the current block, when the coding mode of the current block corresponds to the second coding mode, are coded by an entropy encoder, which was used to code the coefficients of the prediction residue associated with the current block, when the coding mode of the current block corresponds to the first coding mode.

7. The decoding method according to claim 1, wherein the second quantization step is determined by $a*\delta_1+b$ or $c*\delta_1^2+d*\delta_1+e$, with $\delta_1$ corresponding to the first quantization step, and a, b, c, d, e being predetermined numbers.

8. The decoding method according to claim 1, wherein the first quantization step is obtained from a quantization step table predetermined for values of the quantization parameter.

9. The decoding method according to claim 1, wherein the quantization parameter corresponds to a Lagrangian $\lambda$ used to optimise a $D+\lambda*R$ function where R corresponds to a rate of the data stream and D corresponds to an associated distortion of the decoded image.

10. The decoding method according to claim 1, wherein the quantization parameter is decoded from the data stream.

11. The decoding method according to claim 1, wherein the decoding of the current block according to the second coding mode further comprises:

decoding another prediction residue associated with said current block, dequantizing said other prediction residue associated with said current block using said first quantization step, reconstructing said current block from the reconstructed pixels of the current block and said other dequantized prediction residue.

12. A device for decoding a coded data stream representative of at least one image, said image being split into blocks, wherein the decoding device comprises:

a processor (PROC0) configured, for at least one block of the image, referred to as a current block, to:

decode an item of information indicating a coding mode of the current block, determining a coding mode of the current block from among at least a first and a second coding mode;

when the coding mode of the current block corresponds to the first coding mode, decode the current block by determining a first quantization step according to a quantization parameter to dequantize, in a transform domain, a prediction residue associated with the current block, when the coding mode of the current block corresponds to the second coding mode, decode the current block by determining the first quantization step according to the quantization parameter and determining a second quantization step to dequantize, in a spatial domain, a prediction residue associated with the current block, the second quantization step being determined according to the first quantization step.

13. A coding device for coding a coded data stream representative of at least one image, said image being split into blocks, wherein the coding device comprises:

a processor configured, for at least one block of the image, referred to as a current block, to:

code an item of information indicating a coding mode of the current block, determining a coding mode of the current block from among at least a first and a second coding mode;

when the coding mode of the current block corresponds to the first coding mode, code the current block by determining a first quantization step according to a quantization step to quantize a prediction residue associated with the current block in a transform domain, when the coding mode of the current block corresponds to the second coding mode, code the current block by determining the first quantization step according to the quantization parameter and determining a second quantization step to quantize a prediction residue associated with the current block in a spatial domain, the second quantization step being determined according to the first quantization step.

14. A non-transitory computer-readable medium comprising instructions stored thereon which when executed by a processor of a decoding device configure the decoding device to:

decode a coded data stream representative of at least one image performed by a decoding device, said image being split into blocks, the decoding comprising, for at least one block of the image, referred to as a current block:

decoding an item of information indicating a coding mode of the current block, determining a coding mode of the current block from among at least a first and a second coding mode, when the coding mode of the current block corresponds to the first coding mode, decoding the current block comprising determining a first quantization step according to a quantization parameter to dequantize, in a transform domain, a prediction residue associated with the current block, when the coding mode of the current block corresponds to the second coding mode, decoding the current block comprising determining the first quantization step according to the quantization parameter and determining a second quantization step to dequantize, in a spatial domain, a prediction residue associated with the current block, the second quantization step being determined according to the first quantization step.

15. The coding method according to claim 4, wherein the second quantization step is determined by $a*\delta_1+b$ or $c*\delta_1^2+d*\delta_1+e$, with $\delta_1$ corresponding to the first quantization step, and a, b, c, d, e being predetermined numbers.

16. The coding method according to claim 4, wherein the first quantization step is obtained from a quantization step table predetermined for values of the quantization parameter.

17. The coding method according to claim 4, wherein the quantization parameter corresponds to a Lagrangian $\lambda$ used to optimise a $D+\lambda*R$ function where R corresponds to a rate of the data stream and D corresponds to an associated distortion of the decoded image.

18. The coding method according to claim 4, wherein the quantization parameter is coded in the data stream.

* * * * *